(12) United States Patent
Fujimori et al.

(10) Patent No.: US 6,322,217 B1
(45) Date of Patent: Nov. 27, 2001

(54) PROJECTION DISPLAY DEVICE

(75) Inventors: Motoyuki Fujimori, Suwa; Kazuyuki Iinuma, Hotaku-Machi, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/335,793

(22) Filed: Jun. 18, 1999

(30) Foreign Application Priority Data

Jun. 22, 1998 (JP) .................................................. 10-175106

(51) Int. Cl.⁷ .......................... G03B 21/00; G03B 21/26; G03B 21/14
(52) U.S. Cl. ................................ 353/31; 353/34; 353/119
(58) Field of Search .................. 353/31, 34, 37, 353/119

(56) References Cited

U.S. PATENT DOCUMENTS 5,868,485 * 2/1999 Fujimori et al. ..................... 353/119
6,056,407 * 5/2000 Iinuma ................................. 353/119

FOREIGN PATENT DOCUMENTS 10-10994   1/1998   (JP) .

* cited by examiner

*Primary Examiner*—Russell Adams
*Assistant Examiner*—Magda Cruz
(74) *Attorney, Agent, or Firm*—Oliff & Berridge, PLC

(57) ABSTRACT

A projection display device is provided having a mounting mechanism of a modulation element which does not cause pixel displacement at variable temperature when the pixel pitch is reduced. The projection display device is provided with a frame fixed to the light incident face of a prism composite, an intermediate frame detachably mounted to the fixed frame, a screw for fixing the fixed frame and the intermediate frame, a modulation element frame detachably mounted to the intermediate frame for holding a modulation element, a wedge for positioning the modulation element frame and the intermediate frame, and an adhesive layer for fixing the modulation element frame to the intermediate frame with the wedge therebetween. The intermediate frame is provided with a slit which facilitates elastic deformation of portions other than the fixed section for fixing the wedge.

14 Claims, 13 Drawing Sheets

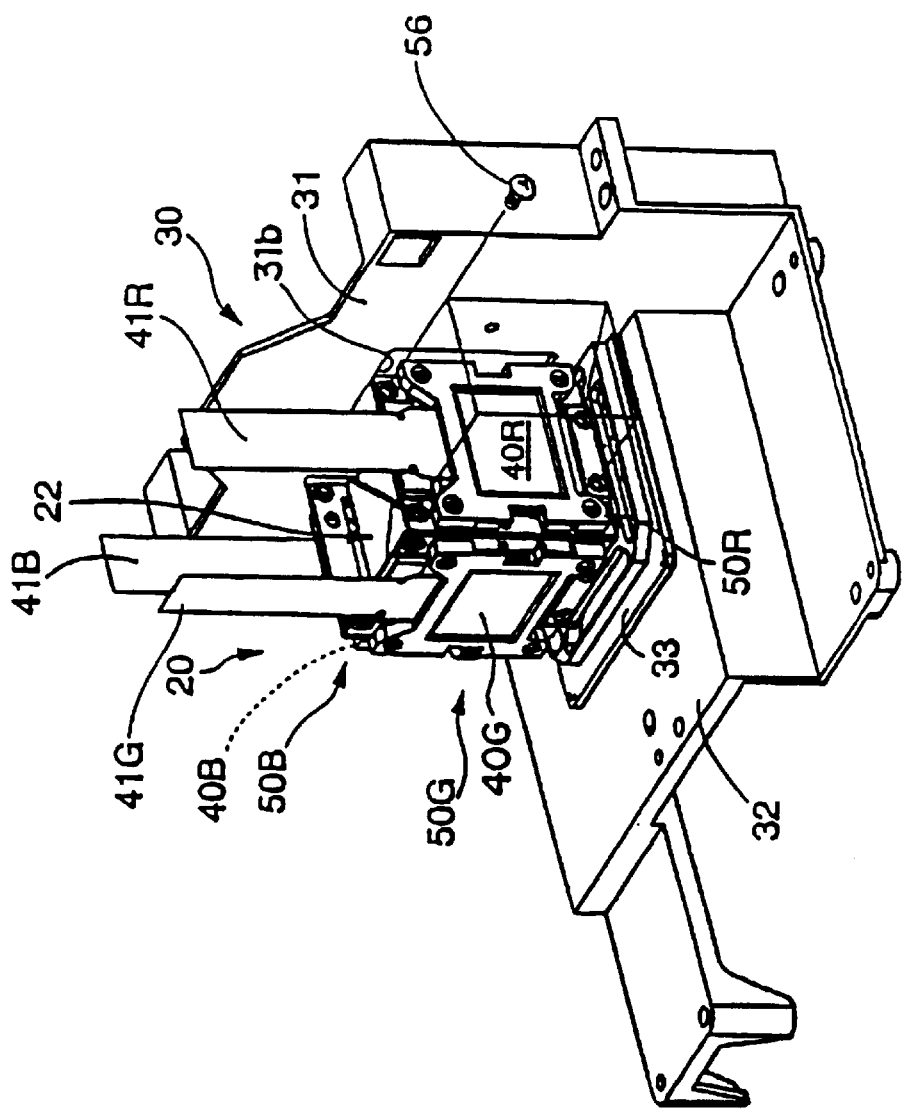

PROJECTION DISPLAY DEVICE

BACKGROUND OF THE INVENTION

1. Field of Invention

The present invention relates to a projection display device which separates light beams from a light source into red, blue and green light beams, modulates these light beams through modulation elements such as liquid crystal panels in response to image information, synthesizes the modulated light beams by a light synthesizing element, and enlarges and projects the light beams on a projection screen by a projection system.

In particular, the present invention relates to a mounting mechanism of a liquid crystal panel to a prism composite constituting a light synthesizing element in this type of projection display device.

2. Description of Related Art

Japanese Patent Application Laid-Open No. 10-10994 discloses a projection display device in which a fixed frame is fixed to the light incident face of a light synthesizing element (a prism composite), and a modulation element frame is detachably mounted to the fixed frame, positioned by a position adjusting member, and then fixed by a fixing member.

In this projection display device, a modulation element is securely positioned and fixed to the light synthesizing element. Hence, displacement in pixel combination can be reduced and the focus can be exactly adjusted. As a result, higher definition can be readily achieved. In addition, the projection display device has a configuration capable of exchanging the modulation element and a miniaturized light synthesizing element, so that the resulting commercial product is compact, lightweight, and highly reliable in spite of external disturbances.

More compact and lightweight projection display devices having higher definition have been required, and thus modulation elements having a pitch which is two-third of the current pixel pitch are being developed.

In a conventional projection display device, however, if the pixel pitch is further decreased, pixel displacement may occur when being allowed to stand at a high or low temperature for a long time after being used at high temperature.

SUMMARY OF THE INVENTION

It is an object of the present invention to provide a projection display device provided with an attachment mechanism of a modulation element which will not result in pixel displacement at variable temperatures even when the pixel pitch is decreased.

One embodiment of the invention for achieving the above object is a projection display device that modulates a plurality of color light beams through a plurality of modulation elements in response to image information, synthesizes the modulated color light beams by a light synthesizing element, and enlarges and projects the synthesized color light beams on a projection screen by a projection system, the processing display device consisting of: a frame system fixed to a light incident face of the light synthesizing element; a modulation element frame detachably mounted to the fixed frame system that holds the modulation elements; a position adjusting member that positions the modulation frame and the fixed frame system; and a fixing member that fixes the modulation element frame to the fixed frame system with the position adjusting member therebetween, the fixed frame system having a fixing section that fixes the position adjusting member, and having a deformable section in a portion other than the fixing section, that elastically deforms compared to the fixing section.

In the projection display device discussed above, the fixed frame system includes: a first frame fixed to the light incident face of the light synthesizing element; and a second frame detachably mounted to the first fixed frame and fixed to the modulation element frame, the second fixed frame being fixed to the first fixed frame by a second fixing member, the second fixed frame having a fixing section that fixes the position adjusting member, and at the least one of the first fixed frame and the second fixed frame having a deformable section in one of a portion which does not overlap the fixing section and a portion other than the fixing section, the deformable section being elastically deformable compared to the one portion.

In the projection display device discussed above, the position adjusting member may be provided near a center between two opposing sides of the modulation element frame.

In the projection display device discussed above, the deformable section may be provided between the fixing section and the second fixing member.

In the projection display device discussed above, a spring constant ratio of the deformable section to the modulation element frame may be in a range of 1 to less than 5.

In the projection display device discussed above, the fixing member may consist of an adhesive, and an elongation of the adhesive may be in a range of $50\% \leq \alpha \leq 125\%$.

In the projection display device discussed above, the fixing member may consist of an adhesive, and a tensile strength of the adhesive may be in a range of $40 \leq \beta \leq 100$ (kg/cm$^2$).

In the projection display device discussed above, the deformable section may consist of at least one slit.

In the projection display device discussed above, the light synthesizing element may consist of a prism, one of the fixed frame system and the first fixed frame may be provided with a section having a slit as the deformable section, and a frame width W at a section provided with the slit may satisfy a relationship: $W <= (a_0/a_1) \times L$, $a_0$ being a linear expansion coefficient of the prism, $a_1$ being a linear expansion coefficient of one of the fixed frame system and the first fixed frame, and L being a length of a bonded section of one side provided with the slit of one of the fixed frame system and the first fixed frame.

In the projection display device discussed above, in the one of fixed frame system and the first fixed frame, a width of a non-slit section among a frame width at the section provided with the slit may be in a range of 0.1 mm to 5 mm.

In the projection display device discussed above, in the one of first fixed frame and the second fixed frame, positions for providing the slit may be non-overlapping with each other.

In the projection display device discussed above, a length of the position adjusting member may be 1/10 to 1/2 a length of the side of the modulation element frame that fixes the position adjusting member.

In the projection display device discussed above, a bonding area between the position adjusting member and the modulation element frame may be larger than a bonding area between the position adjusting member and one of the fixed frame system and the first fixed frame.

Another embodiment of the invention is a projection display device that modulates a plurality of color light beams through a plurality of modulation elements in response to image information, synthesizes the modulated color light beams by a light synthesizing element, and enlarges and projects the synthesized color light beams on a projection screen by a projection system, the projection display device consisting of: a frame system fixed to a light incident face of the light synthesizing element; a modulation element frame detachably mounted to the fixed frame system that holds the modulation elements; a position adjusting member that positions the modulation element frame and the fixed frame system; and a fixing member that fixes the modulation element frame to the fixed frame system with the position adjusting member therebetween, at least one of the modulation element frame and the position adjusting member consisting of a synthetic resin and being annealed at a predetermined temperature for a predetermined time prior to assembly.

BRIEF DESCRIPTION OF THE DRAWINGS

FIGS. 2(A)–(B) are drawings showing an arrangement of respective components in the interior of the device shown in FIG. 1, wherein FIG. 2(A) shows a planar arrangement and FIG. 2(B) shows a longitudinal arrangement.

FIG. 4 is a partial isometric view of a head plate, and a prism unit and a liquid crystal panel unit attached thereto.

DETAILED DESCRIPTION OF PREFERRED EMBODIMENTS

Embodiments of the present invention will now be described in more detail with reference to the drawings.
(Overall Configuration)

Figure 1:
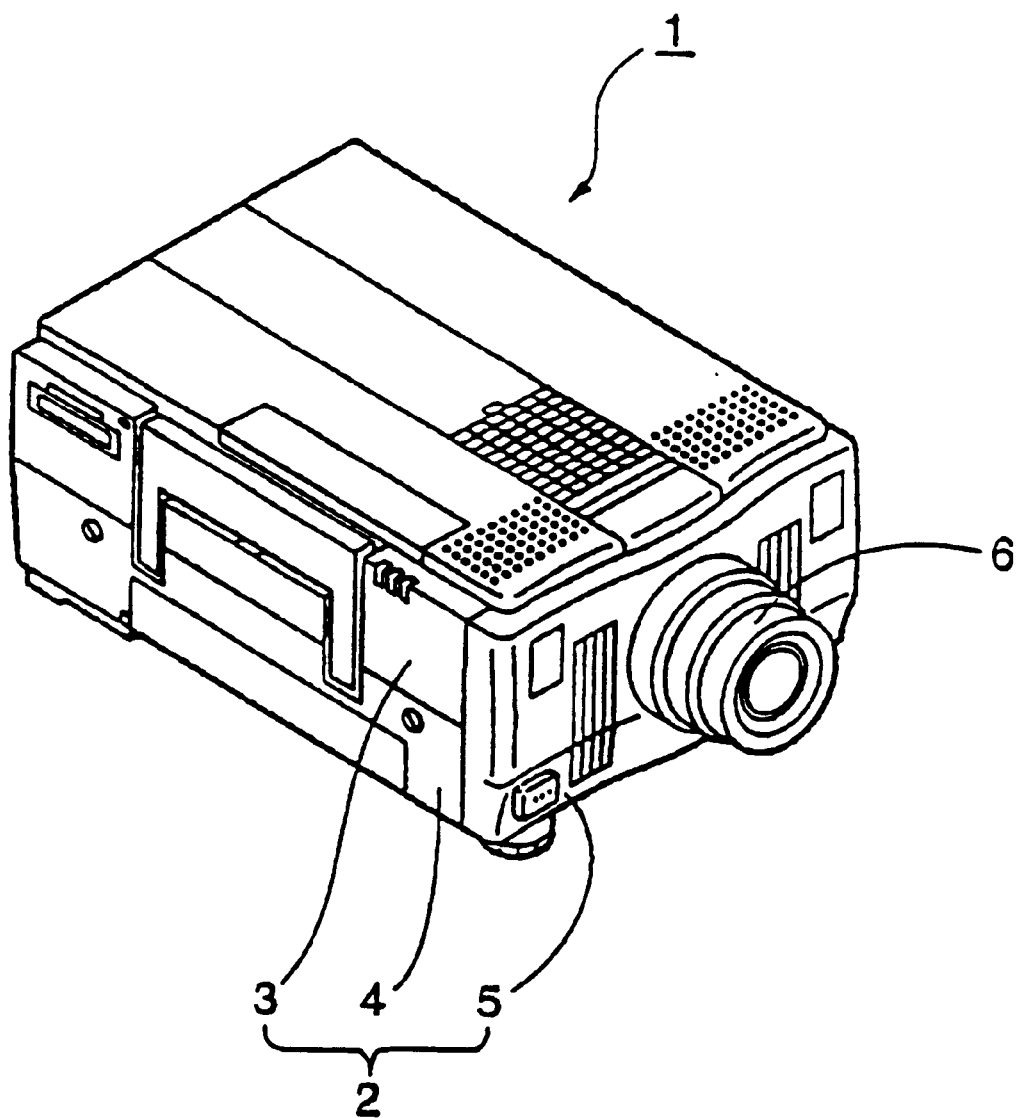
FIG. 1 is an isometric view of an outline of a projection display device in accordance with the present invention.

FIG. 1 shows an outline of a projection display device in accordance with the present invention. An exterior case 2 of a projection display device 1 in this embodiment is a rectangular parallelepiped. The exterior case 2 fundamentally includes an upper case 3, a lower case 4, and a front case 5 defining the front face of the device. The leading end section of a projection lens unit 6 provides from the center of the front case 5.

Figures 2A, 2B:
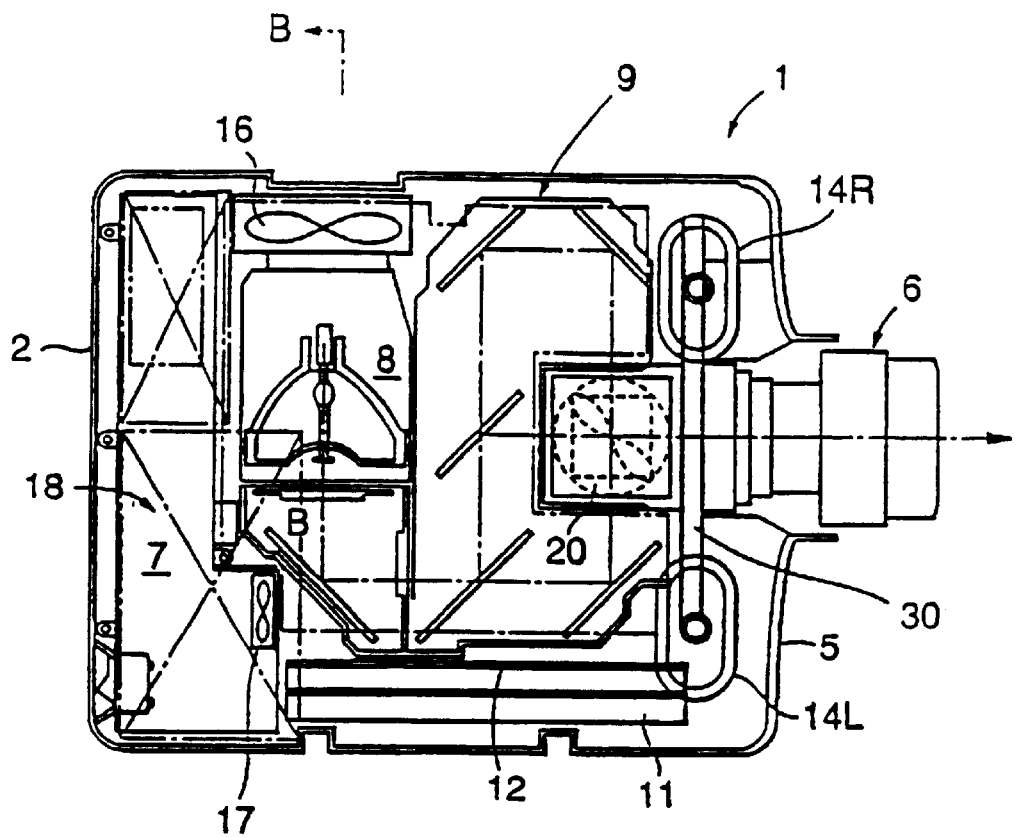

FIGS. 2(A)–(B) show arrangements of respective components in the interior of the exterior case 2 of the projection display device 1. As shown in these drawings, a power source unit 7 is arranged at the rear end in the interior of the exterior case 2. A light source lamp unit 8 and an optical unit 9 are arranged adjacent thereto at the front side of the device. The base end of the projection lens unit 6 lies in the front center of the optical unit 9. On the other hand, an interface substrate 11 mounting an input-output interface circuit is arranged at one side of the optical unit 9 from the front to the rear of the device, and a video substrate 12 mounting a video signal processing circuit is arranged parallel thereto. A control substrate 13 for controlling driving of the device is arranged above the light source lamp unit 8 and the optical unit 9.

Speakers 14R and 14L are arranged at the right and left corners, respectively, of the front end portion of the device.

An intake fan ISA for cooling is arranged in the upper center of the optical unit 9, and a circulating fan 15B for cooling and circulation is arranged in the bottom center of the optical unit 9. An exhaust fan 16 is arranged on the side wall of the projection display device 1 behind the light source lamp unit 8. An auxiliary cooling fan 17 is arranged at a position facing the end of the substrates 11 and 12 in the power source unit 7 for sucking a cooling air stream from the intake fan 15A into the power source unit 7.

A floppy disk driving unit 18 is arranged just above the power source unit 7 on the left side of the device.
(Optical Unit and Optical System)

Figure 3A:
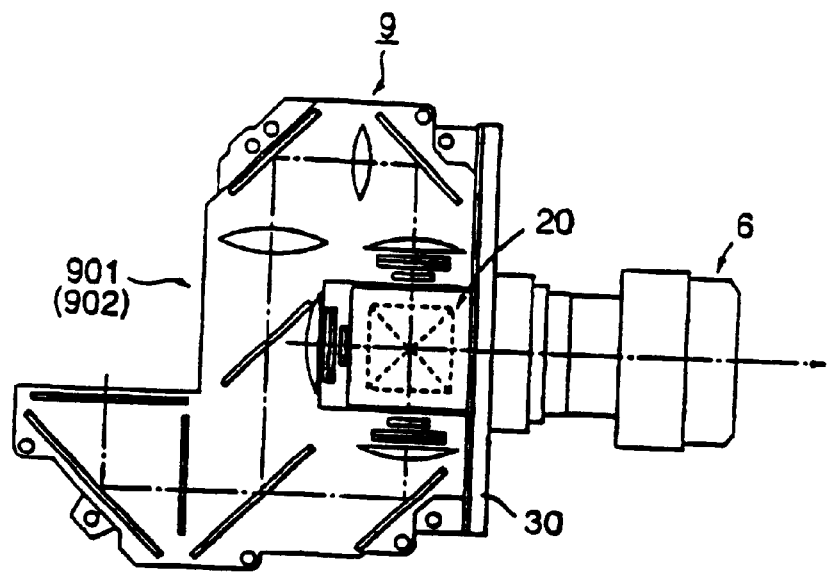
FIG. 3(A) shows an optical lens unit and a projection lens unit.

FIG. 3(A) shows a part of the optical unit 9. As shown in this drawing, the optical unit 9 has a configuration in which optical elements constituting the light synthesizing element other than a prism unit 20 are disposed between upper and lower light guides 901 and 902 and are held thereby. The upper light guide 901 and the lower light guide 902 are fixed to the upper case 3 and the lower case 4, respectively, by screws. The upper and lower light guides 901 and 902 are also fixed to the head plate 30 by screws.

The prism unit 20 is fixed by screws to the back face of a thick head plate 30, which is a die-cast plate. The base end of the projection lens unit 6 as a projection system is fixed to the front face of the head plate 30 by screws. Thus, in the configuration of this embodiment, the prism unit 20 and the projection lens unit 6 are integrally fixed with the head plate 30 therebetween. Accordingly, these two parts are integrated so as to sandwich the head plate 30 having high rigidity. If impact or the like acts on the projection lens unit 6, these two parts will not be displaced.

Figure 3B:
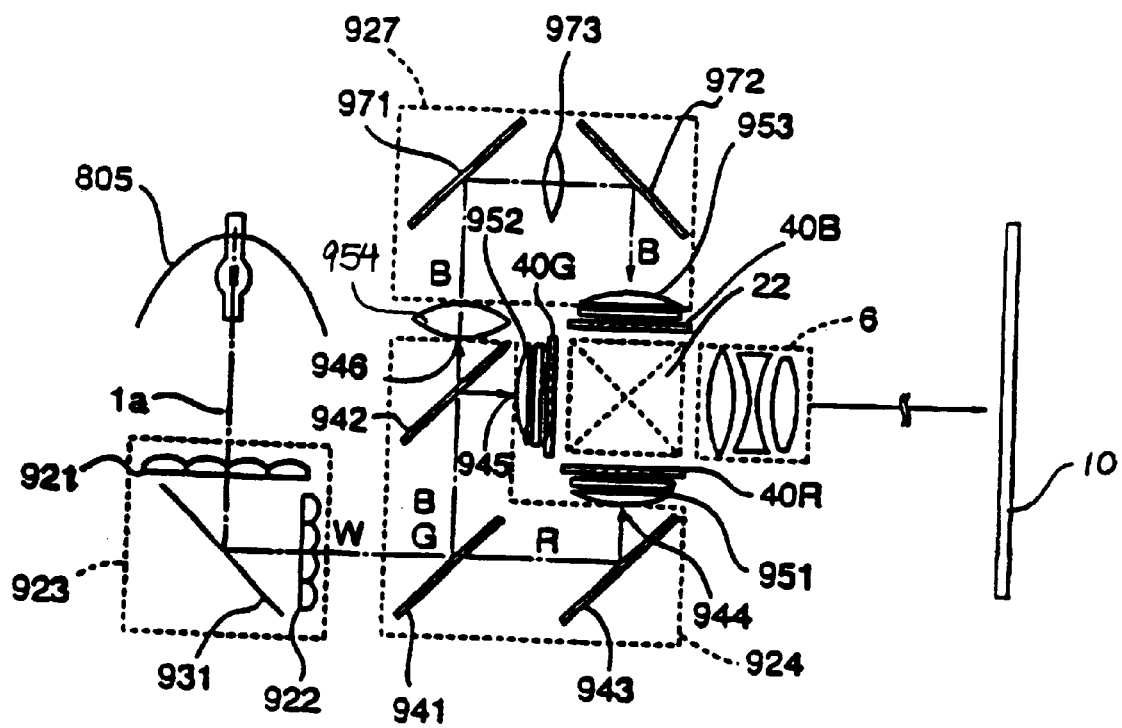
FIG. 3(B) shows an outline configuration of an optical system.

FIG. 3(B) shows an outline configuration of an optical system mounted in the projection display device 1. The optical system in this embodiment includes a light source lamp 805, an illumination optical system 923 including optical integrator lenses 921 and 922 being uniform illumination optical elements, a color-separating optical system 924 which separates light beams W emitted from the illumination optical system 923 into red, green, and blue light beams R, G, and B, three liquid crystal panels 40R, 40G, and 40B, as modulation elements for modulating these color light beams, a prism composite 22 as a color synthesizing optical system for synthesizing the modulated light beams, and a projection lens unit 6 for enlarging and projecting the synthesized light beams on a projection screen. The system also includes a light guide system 927 for introducing the blue light beam B, among the color light beams separated by the color-separating optical system 924, into the respective liquid crystal panel 40B.

Examples of usable light source lamp 805 include a halogen lamp, a metal halide lamp, and a xenon lamp. The uniform illumination optical system 923 has a reflective mirror 931 which bends the optical axis I a of the light emitted from the illumination optical system 923 perpendicularly towards the front of the projection display device 1. The optical integrator lenses 921 and 922 are orthogonally arranged in front of and behind the reflective mirror 931.

The color-separating optical system 924 include a blue-green reflecting dichroic mirror 941, a green reflecting dichroic mirror 942, and a reflecting mirror 943. The blue light beam B and the green light beam G contained in the light beams W are perpendicularly reflected by the blue-green reflecting dichroic mirror 941, towards the green reflecting dichroic mirror 942. The red light beam R passes through the dichroic mirror 941, and is perpendicularly reflected by a reflecting mirror 943 towards the prism composite 22 through an emitting section 944 for the red light beam. Only the green light beam G among the blue and green light beams B and G reflected by the dichroic mirror 941 is perpendicularly reflected by the green reflecting dichroic mirror 942 towards the color synthesizing optical system (prism composite 22) through an emitting section 945 for the green light beam. The blue light beam B passing through the dichroic mirror 942 is emitted towards the light guide system 927 through an emitting section 946 for the blue light beam. In this embodiment, all the distances from the emitting section for the light beams in the uniform illumination optical system 923 to the emitting sections 944, 945 and 946 for the respective color light beams in the color-separating optical system 924 are equal to each other.

Condensing lenses 951 and 952 are arranged at the emitting side of the emitting sections 944 and 945, respectively, for color light beams in the color-separating optical system 924. Thus, the respective color light beams emitted from these emitting sections 944 and 945 are collimated by these condensing lenses 951 and 952.

Among the respective collimated color light beams R, G, and B, the red and green light beams R and G are incident on and modulated by the liquid crystal panels 40R and 40G so as to impart image information corresponding to these colors. That is, these liquid crystal panels 40R, 40G, and 40B are switching-controlled by image signals corresponding to image information from a driving system (not shown in the drawing) so as to modulate these color light beams passing therethrough. Any conventional driving system can be used as such a driving system. On the other hand, the blue light beam B is introduced to the respective liquid crystal panel 40B through a light guide system 927, and is modulated in response to image information. The liquid crystal panels 40R, 40G, and 40B in this embodiment can use polysilicon TFTs as switching elements.

The light guide system 927 includes an incident-side reflecting mirror 971, and emitting-side reflecting mirror 972, an intermediate lens 973 disposed therebetween, an incident side lens 954 arranged at the emitting side of the emitting section 946, and a condensing lens 953 disposed in front of the liquid crystal panel 40B. Among the optical paths of the respective color light beams, that is, distances from the light source lamp 805 to respective liquid crystal panels, that of the blue light beam B is the longest, and thus the optical loss of this beam is the greatest. By disposing the light guide system 927, the optical loss can be suppressed.

These color beams modulated by the respective liquid crystal panels 40R, 40G, and 40B are incident on the prism composite 22, and are synthesized thereby. In this embodiment, the prism composite 22 consisting of dichroic prisms is used as the color synthesizing optical system. The synthesized color image is enlarged and projected on a projection screen 10 placed at a predetermined position through the projection lens unit 6.

(Configurations of Prism Unit and Head Plate)

FIG. 4 shows a head plate 30 and a prism unit 20 attached to the head plate 30. As shown in this drawing, the head plate 30 consists basically of a vertical wall 31 extending vertically in the width direction of the device, and a bottom wall 32 extending horizontally from the bottom end of the vertical wall 31. The vertical wall 31 is provided with a rectangular opening 31 b transmitting the light emitted from the prism unit 20. The vertical wall 31 has many reinforcing ribs and thus has high rigidity. The prism unit 20 and the projection lens unit 6 are positioned and fixed to each other so as to sandwich the vertical wall 31 (see FIG. 3(A)). Thus, these are highly integrated, and the possibility of mutual displacement will be significantly reduced if an impact force is applied thereto.

The prism unit 20 is placed on the bottom wall 32 of the head plate 30. The prism unit 20 has a rectangular parallelepiped prism composite 22 formed by bonding the slanted faces of four prisms 21, each having a right isosceles triangular cross-section (see FIG. 5), and a prism holding plate 33. The bottom of the prism composite 22 is fixed to the surface of the prism holding plate 33 by any means such as bonding, and the prism holding plate 33 is fixed to the bottom wall 32 of the head plate 30. Liquid crystal panel units 50R, 50G, and 50B having the same configuration are attached to three side walls which function as light incident faces of the prism composite 22. The liquid crystal panels 40R, 40G, and 40B are held in the liquid crystal panel units 50R, 50G, and 50B, respectively.

(Configuration for Attaching Liquid Crystal Panel)

Figure 5:
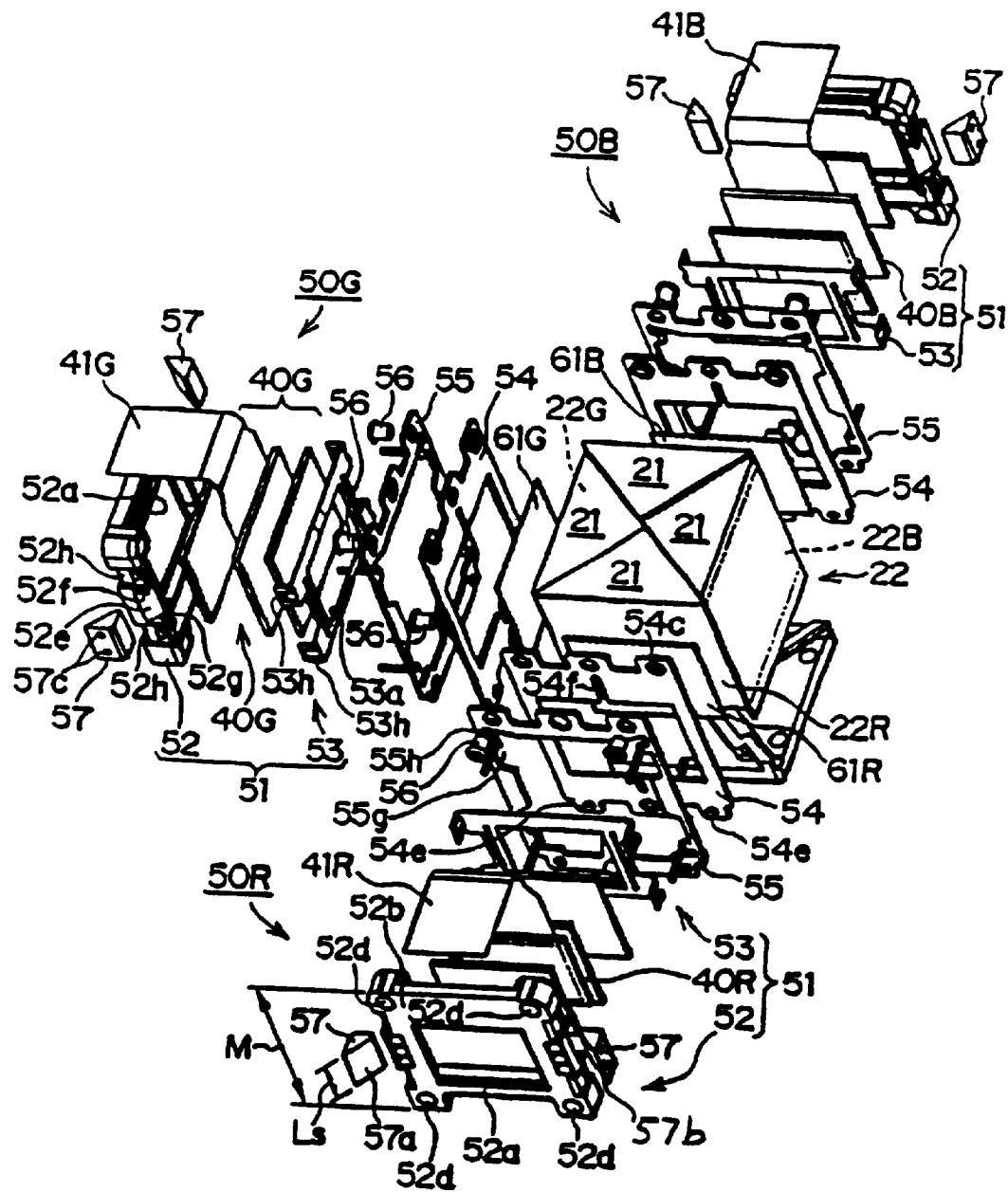
FIG. 5 is an exploded isometric view of respective components of the liquid crystal panel units 50R, 50G, and 50B in FIG. 4.
Figure 6:
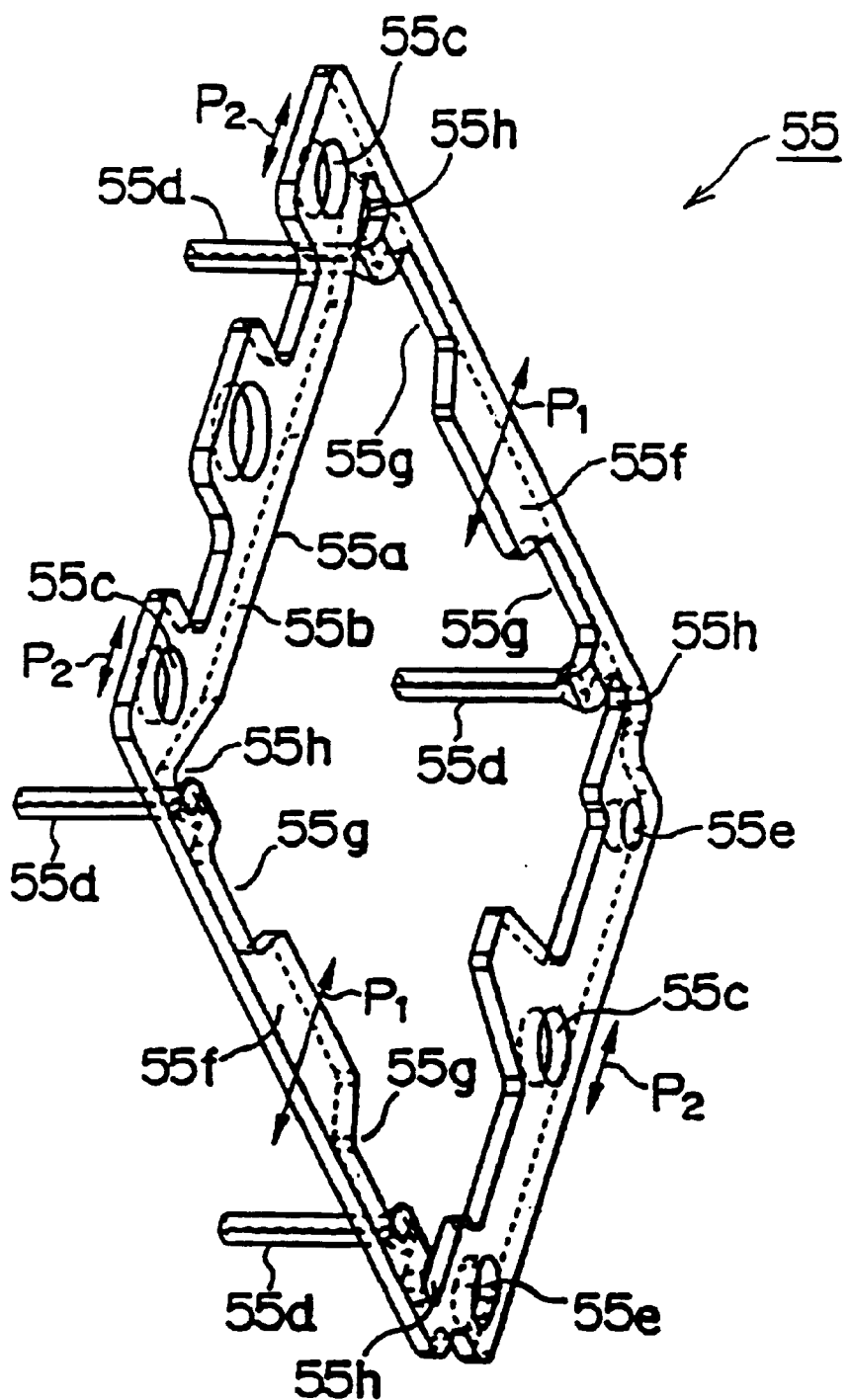
FIG. 6 is an isometric view of an intermediate frame 55 in this embodiment.
Figure 7:
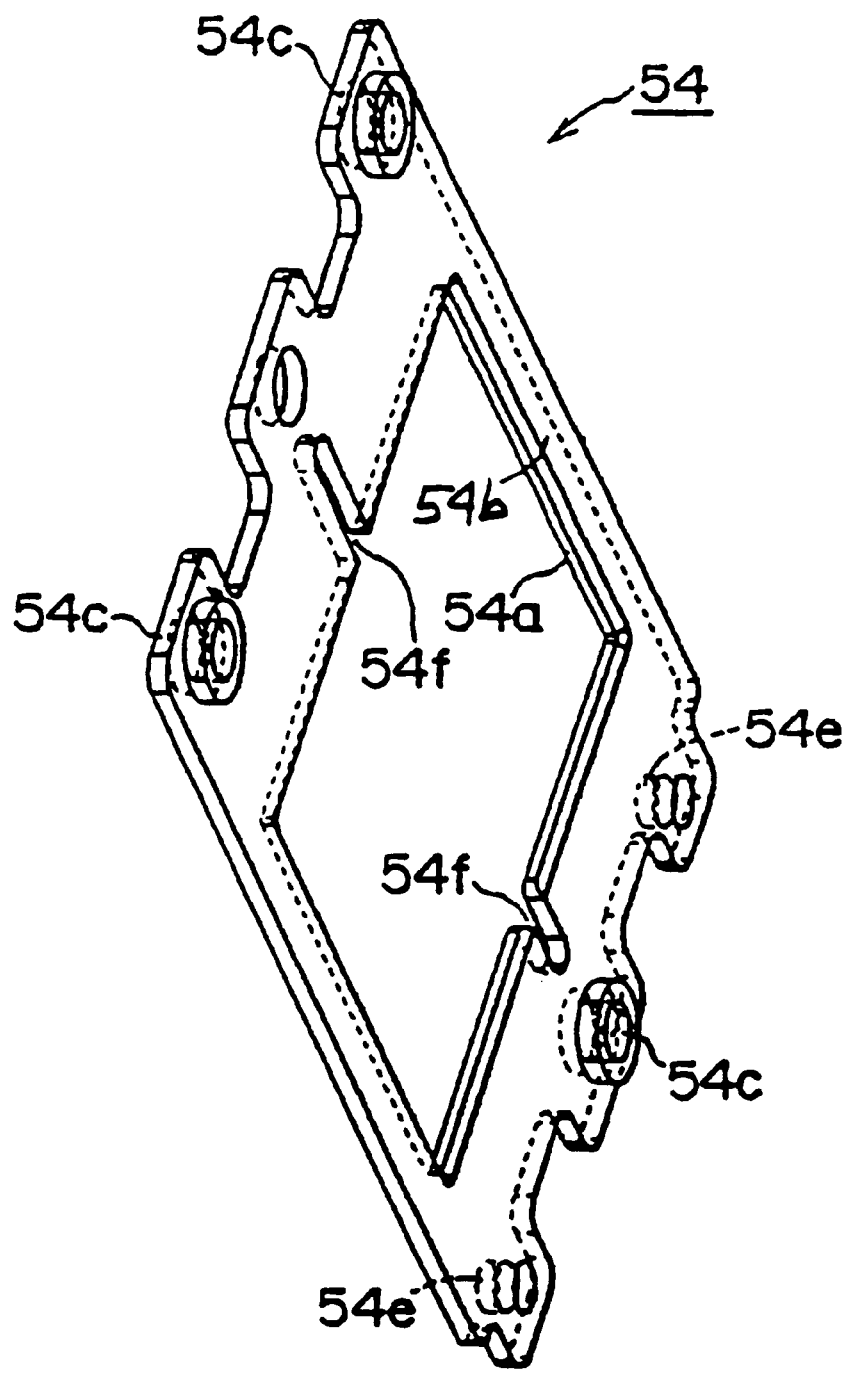
FIG. 7 is an isometric view of a fixed frame 54 in this embodiment.
Figure 8:
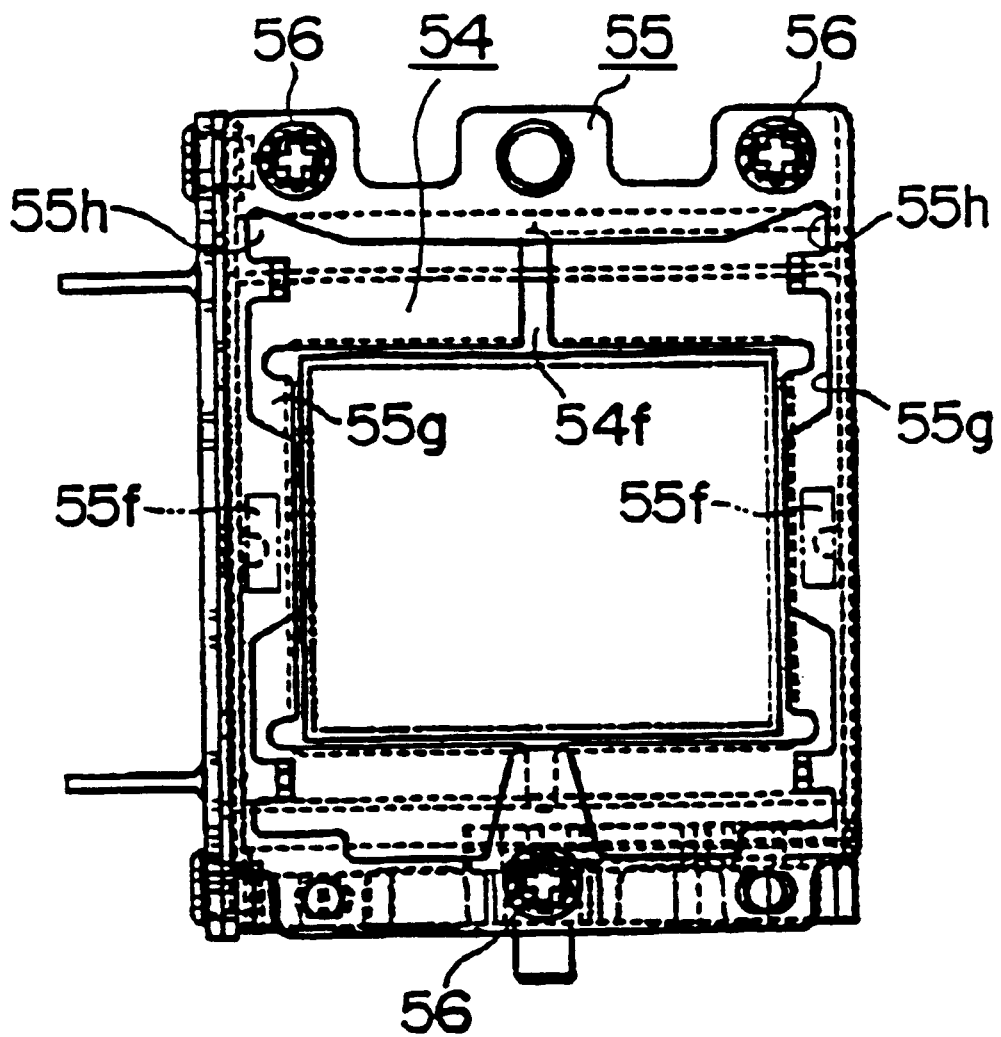
FIG. 8 is a front view showing an overlapping of an intermediate frame 55 and a fixed frame 54.

FIG. 5 is an exploded view of respective components of the liquid crystal panel units 50R, 50G, and 50B; FIG. 6 is an perspective view of an intermediate frame 55 in this embodiment; FIG. 7 is a perspective view of a fixed frame 54 in this embodiment; and FIG. 8 is a front view showing overlapping of the intermediate frame 55 (a second fixed frame) and the fixed frame 54. The frames shown in FIGS. 6 and 7 are extracted from the green liquid crystal panel unit 50G in FIG. 5.

With reference to these drawings, a configuration for attaching the liquid crystal panel unit 50G as an example to the prism composite 22 will now be described (the units 50R and 50B will also be referred to depending on the angle in these drawings when these units are readily seen).

The liquid crystal panel unit 50G has a panel frame 51 for holding the liquid crystal panel 40G. The panel frame 51 has first and second frames 52 and 53 and the liquid crystal panel 40G is disposed therebetween. The liquid crystal panel unit 50G also has a fixed frame 54 which is fixed by bonding to the light incident face 22G of the prism composite 22. The panel frame 51 is detachably fixed to the fixed frame 54 with the intermediate frame 55 disposed therebetween.

The configuration of each component will now be described in detail. The first frame 52 has a rectangular opening 52a for transmitting light, and a peripheral wall 52 b having a constant thickness is provided on the four sides thereof. The second frame 53 also has a rectangular opening 53a for transmitting light. The second frame 53 has a size such that it can be just fitted into the interior of the peripheral wall 52 b of the first frame 52. When the second frame 53 is fitted to the first frame 52 while sandwiching the liquid crystal panel 40G between the first and second frames 52 and 53, the panel frame 51 has a configuration in which the liquid crystal panel 40G is sandwiched between these first and second frames 52 and 53.

In the fitting structure of the first frame 52 and the second frame 53, engaging grooves 52h are formed above and below guide grooves 52e to 52g of the first frame 52, and are engaged with hooks 53 h formed in the second frame 53.

The intermediate frame 55 is, as enlarged in FIG. 6, a rectangular flame having substantially the same size as that of the first frame 52 of the panel frame 51, and has a rectangular opening 55a for transmitting light, and a peripheral wall 55b having a constant thickness is formed on the four sides thereof. The intermediate frame 55 has engaging projections 55d extending perpendicularly from the frame surface at four corners of the rectangular opening 55a. On the other hand, the first frame 52 of the panel frame 51 has engaging holes 52d formed at the positions corresponding to the respective engaging projections 55d (see the unit 50R in FIG. 5). When each engaging hole 52d of the panel frame 51 is positioned to the respective engaging projection 55d of the intermediate frame 55 so that these mutually overlap, each engaging projection 55d is inserted in the respective engaging hole 52d to form a temporary tacking state.

On the other hand, as shown in FIG. 7, the fixed frame 54 also has a rectangular opening 54a for transmitting light, and a peripheral wall 54b having a constant thickness is formed on the four sides thereof. The rear face of the fixed frame 54 is fixed to the light incident face 22G of the prism composite 22 with an adhesive. Screw holes 54c are formed at two corners of the upper frame section of the fixed frame 54 and in the center in the transverse (right to left) direction of the lower frame section of the fixed frame 54. The intermediate frame 55 also has three screw holes SSc corresponding to these three screw holes 54c of the fixed frame 54. Flat countersunk head screws 56 are inserted into the screw holes 54c and 55c so that the fixed frame 54 is fixed to the intermediate frame 55. In this embodiment, the intermediate frame 55 is fixed to the fixed frame 54 by three screws 56, but the number of the screws may be four or more. In general, the smaller the number of screws, the fewer steps necessary for the screwing procedure.

Two engaging projections 54e are formed at the right and left corners of the lower section of the fixed frame 54 (see the unit 50R in FIG. 6), and two engaging holes 55e engaging with these two engaging projections 54e of the fixed frame 54 are formed at the right and left corners of the lower section of the intermediate frame 55.

Thus, when these are fixed by screws 56, the engaging holes 55e of the intermediate frame 55 are fitted to the engaging projections 54e of the fixed frame 54, and then the intermediate frame 55 is wedged to the fixed frame 54 so that the intermediate frame 55 is temporarily tacked to the fixed frame 54. Accuracy of positioning of these two frames can be further improved in such a manner.

(Positioning Member—Wedge)

The liquid crystal panel unit 50G in this embodiment has positioning members for positioning the panel frame 51 with respect to the intermediate frame 55 fixed to the fixed frame 54. As the positioning members, two wedges 57 are used. Wedge guide faces 52e to 52g contacting the slanted faces 57a of the wedges 57 are formed in the centers in the vertical direction of the two right and left side faces of a peripheral wall 52b of the first frame 52 of the panel frame 51.

When the panel frame 51 is temporarily tacked to the intermediate frame 55, wedging grooves are formed between the wedge guide face 52e of the first frame 52 and the frame section of the opposing intermediate frame 55. After the panel frame 51 is temporarily tacked to the intermediate frame 55, two wedges 57 are wedged to the right and left of the first frame 52 and then the wedged positions of the wedges 57 are adjusted to position the liquid crystal panel 40G. The intermediate frame 55 and the panel frame 51 can be directly fixed by the wedges 57 without temporary tacking when positioning is performed by setting them to an assembling machine or jig.

The wedge 57 in this embodiment has two blank holes 57c on the rear face 57b. When a jig is used for chucking the wedge 57, these blank holes 57c function as engaging sections for chucking. That is, the formation of the blank holes 57c facilitates the chucking operation.

In this embodiment, the blank holes 57c for engaging in the chucking operation are formed on the rear face 57b of the wedge 57. Any other component may have the engaging section. For example, the engaging section such as a blank hole for chucking may be formed on the outer face of the peripheral wall 52b of the first frame 52 of the panel frame 51.

A glass wedge 57 can be generally used. When the first frame 52 is formed of a molded resin, it has a larger thermal expansion coefficient than that of the glass. The difference in the thermal expansion coefficient may cause detachment of the wedge 57 from the frame or damage to the wedge 57 due to a change in temperature. The wedge 57 is preferably formed of an acrylic molded resin to avoid such defects. Since the acrylic wedge 57 is formed by molding, it enables significant cost reduction compared to glass. When a UV transmissive material is used for the wedge 57, a UV-curable adhesive having a short curing time without temperature rise can be used to fix the wedge 57.

Figure 13A:
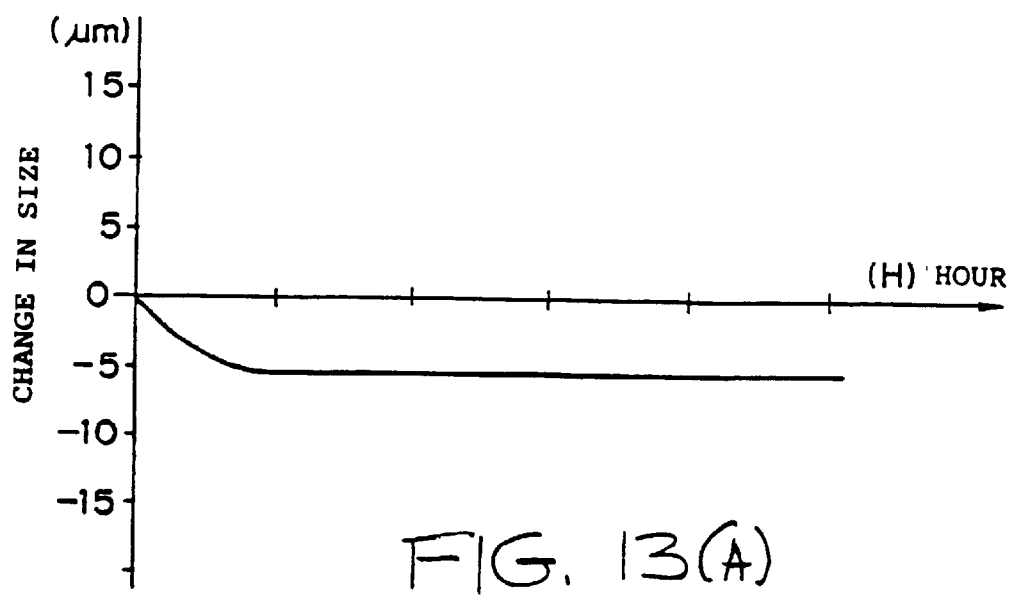
FIG. 13 shows graphs for illustrating an annealing treatment of a panel frame and a wedge.
Figure 13B:
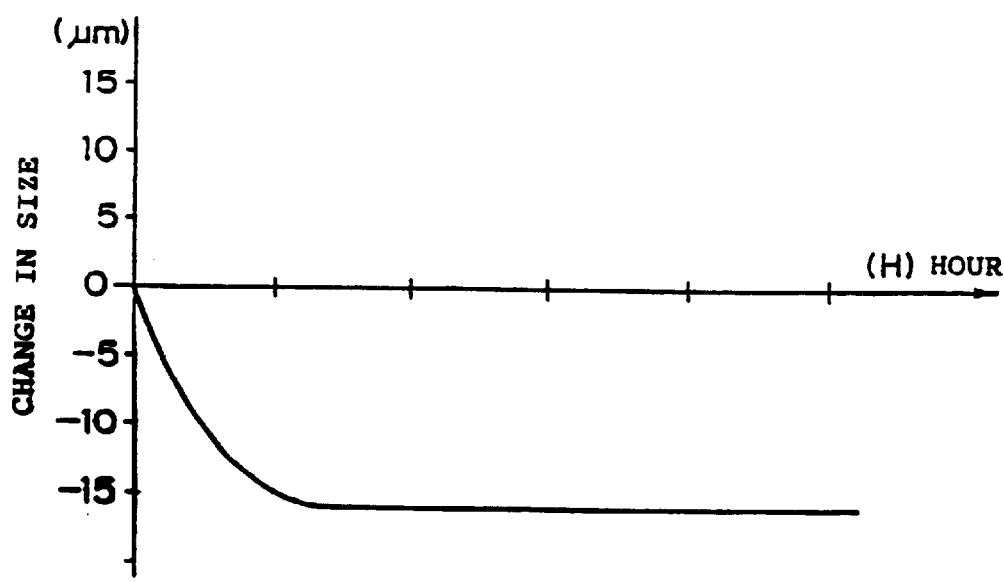

As described above, the molded resin wedge 57 may deform when it is allowed to stand after it is used for a predetermined time. The molded resin panel frame 51 may also do this. In this embodiment, the molded resin wedge 57 and panel frame 51 were heated at a predetermined temperature (for example, 70 to 100° C.), as shown in FIG. 13, and it was determined that a change in size was stabilized by heat treatment for a predetermined time (for example, 3 to 24 hours).

(Assembly Procedure of Liquid Crystal Panel Unit)

The liquid crystal panel unit 50G in this configuration is assembled to the light incident face 22G of the prism composite 22 as follows. A panel frame 51 provided with a liquid crystal panel 40G is prepared. Next, a fixed frame 54 is positioned to and then bonded to the face 22G of the prism composite 22. An UV-curable adhesive or the like can be used as an adhesive. Next, an intermediate frame 55 is positioned to the surface of the bonded fixed frame 54, and the intermediate frame 55 is fixed by three screws 56. The panel frame 51 provided with the liquid crystal panel 40G is positioned to and temporarily tacked to the intermediate frame 55. That is, engaging projections 55d of the intermediate frame 55 are fitted to engaging holes 52d of the panel frame 51, and then the panel frame 51 is wedged to the intermediate frame 55. When the fixed frame 54 and the intermediate frame 55 are previously integrated by the screws 56 before the fixed frame 54 is fixed to the prism composite 22 by bonding, accuracy of positioning is readily improved.

Next, using wedges 57 as positioning members, the liquid crystal panel 40G is positioned with respect to the face 22G of the prism composite 22. That is, two wedges 57 are inserted between the temporarily tacked panel frame 51 and intermediate frame 55 along the wedge guide face 52e formed in the first frame 52. Alignment and focusing of the liquid crystal panel 40G is performed by adjusting the inserted depth of each wedge 57.

After the positioning, these wedges 57 are fixed with an adhesive to the panel frame 51 and intermediate frame 55 which are to be positioned. An UV-curable adhesive can be used also in this case.

(Positioning Process and Fixing Process of Wedge)

The positioning process and the fixing process of the wedges 57 will now be described in further detail according to the order of processing steps.

The focus plane of the liquid crystal panel 40G is aligned into the focus plane of a projection lens unit 6 using a specific adjuster. In such a state, as described above, a UV-curable adhesive is injected into the gap formed by engaging the engaging projections 55d of the intermediate frame 55 with the engaging holes 52d of the panel frame 51, and cured by UV irradiation for temporarily tacking. Next, the UV-curable adhesive is exposed to ultraviolet rays through the exposed faces of the wedges 57 for final fixing. Based on the liquid crystal panel 40G arranged in the center of the liquid crystal panels 40R, 40G, and 40B, focusing of the liquid crystal panels 40R and 40B and mutual pixel adjustment are also performed, followed by the preliminary fixing and final fixing.

Since the preliminary fixing is performed after setting the head plate 30 provided with the prism composite 22 and the projection lens unit 6 to an adjuster, optimized adjustment can be achieved in view of individual characteristics of the components. Chucking of the panel frame 51 to the adjuster is performed based on the outer shape of the first frame 52.

Since the liquid crystal panel units 50R and 50B holding the liquid crystal panels 40R and 40B, respectively, have the same configuration as that of the liquid crystal panel 40G, description thereof is omitted.

FIG. 4 shows a state in which the liquid crystal panel units 50R, 50G, and 50B are mounted to the three faces 22R, 22B and 22G of the prism composite 22 in such a manner. In FIG. 4, components extending upwardly from the respective liquid crystal panel units 50R, 50G, and 50B are flexible cables 41R, 41G, and 41B for wiring.

(Materials or the like for each Component)

The first frame 52 may be composed of a molded thermosetting resin containing glass fiber or calcium carbonate. Such a resin material has a thermal expansion coefficient which is near to that of glass, compared to general resin materials. Thus, pixel displacement caused by thermal deformation can be avoided when it is bonded to the prism composite 22.

Although the use of an UV-curable adhesive is described, any other adhesive may be used. For example, when the fixed frame 54 and the wedges 57 are fixed by bonding using a hot melt type adhesive, problems caused by a filter described later will not occur.

As an adhesive for fixing the fixed frame 54 to the prism composite 22, an UV-curable adhesive can be used as described above. In such a case, coating of a primer material is preferable to improve bonding characteristics.

(Filter)

In the prism composite 22 in this embodiment, as described above, the light incident face 22R for red light beams faces the light incident face 22B for blue light beams. Since the blue light beam has a shorter wavelength, it may partly pass through the reflective film of the prism composite 22 and may be incident on the opposing light incident face 22R for the red light beam, in some cases. When such back light is incident on the liquid crystal panel 40R, malfunction will occur. A filter 61R is provided on the light incident face 22R for the red light beam to shield the back light.

Since the effect of the backlight of the blue light beam is most significant, a filter is provided on only the light incident face 22R for the red light beam. In the case in which the effect of the backlight of the other color light beams is significant, a filter 61G or 61B may be provided on another face, or filters may be provided on a plurality of faces.

Such a filter itself, however, shields ultraviolet rays during fixing by bonding, and the UV-curable adhesive for fixing the fixed frame 54 to the light incident faces 22R, 22G, and 22B of the prism composite 22 may be insufficiently exposed to ultraviolet rays at some portions. In order to securely fix the fixed frame 54 to the light incident face 22R, it is preferable that a primer material be applied to these bonding faces and an anaerobic adhesive be used. Such a treatment may be applied to the incident faces not having filters.

The liquid crystal panel units 50R, 50G and 50B having the above configuration basically have the following advantages.

(1) The four edges of the liquid crystal panel 40R (40G, 40B) are covered with and protected by the rectangular panel frame 51. Thus, the liquid crystal panel 40R (40G, 40B) can be mounted to the prism composite 22 without direct contact with the liquid crystal panel 40R (40G, 40B). Accordingly, the liquid crystal panel 40R (40G, 40B) is protected from breakage and defects due to collision with the other components. Furthermore, the periphery of the liquid crystal panel 40R (40G, 40B) is covered with the panel frame 51 which shields the panel frame 51 from external light. Thus, malfunction of the liquid crystal panel 40R (40G, 40B) due to external light does not occur.

(2) The panel frame 51 provided with the liquid crystal panel 40R (40G, 40B) is detachably fixed to the light incident face 22R (22G, 22B) of the prism composite 22 with the intermediate frame 55 therebetween by screws. When, for example, the liquid crystal panel 40R (40G, 40B) is damaged, it is exchangeable by a simple operation, that is, by loosening the screws. Since the liquid crystal panel 40R (40G, 40B) is not directly fixed to the prism composite 22, the prism composite 22 is not damaged during such exchange and thus expensive components can be used effectively.

(3) The panel frame 51 provided with the liquid crystal panel 40R (40G, 40B) can be temporarily tacked to the intermediate frame 55. After forming the temporary tacking state, the liquid crystal panel 40R (40G, 40B) can be positioned with respect to the light incident face 22R (22G, 22B) of the prism composite 22 using the wedges 57. The formation of the temporary tacking state can simplify the positioning operation using the wedges 57 in the other step, resulting in shortening the cycle time of the facility.

(4) Since the wedge guide face 52e is formed in the first frame 52, top end faces 52f and 52g are formed thereon and thereunder and the wedge 57 is guided by these three faces. That is, when this portion is filled with an adhesive and when the wedge 57 is inserted, the wedge 57 is spontaneously moved into the interior by surface tension of the adhesive and being guided by these three faces. Thus, the mounting operation of the wedge 57 is resistant to external disturbance occurring in the step and is simplified.

(5) In this embodiment, a flat fixed frame 54 and a flat intermediate frame 55 are used. As described with reference to FIG. 2(B), a fan 15B is disposed under the prism composite 22, so as to flow cooling air from the bottom to the top. A straightening vane is preferably arranged above the fan 15B so that flow turbulence does not occur. Since the flat fixed frame 54 and the flat intermediate frame 55 are used, the position for attaching the straightening vane can be extended up to just below the liquid crystal panel unit 50G. Thus, the cooling air effectively flows from the bottom to the top. Since the shapes of these frames are simple, the components can be readily formed with high forming accuracy.

(6) In each of the liquid crystal panel units 50R, 50G and 50B, two wedges 57 are used for positioning, and are fixed by bonding to the central portions in the vertical direction at the right and left sides of the first frame 52 and the intermediate frame 55. If the positions of the fixed wedges 57 are inaccurate, excess stress concentration may occur in each component due to thermal deformation of the first frame 52, the intermediate frame 55, and the wedges 57. As a result, the wedges 57 may be detached from the first frame 52 or the intermediate frame 55. Since the wedges 57 are fixed in the left and right centers, as described above, the first frame 52 and the intermediate frame 55 can thermally deform in the vertical direction without restriction from the central portion. Since these frames are not constrained significantly from thermal deformation, undesirable stress concentration and detachment of wedges are avoidable.

The detailed configuration of the projection display device in this embodiment will now be described in further detail.

(Deformable Portions of Fixed Frame and Intermediate Frame)

In this embodiment, the intermediate frame 55 further has fixing sections 55$f$ (the sections of double-dotted chain line in FIG. 8) for fixing the wedges 57 near the centers of the right and left sides of the peripheral wall 55$b$, and slits 55$g$ and 55$h$ as deformable sections are formed above and below the fixing section 55$f$ in the inner face of the peripheral wall 55$b$. Herein the deformable section means a section which is readily subjected to elastic deformation. The slit 55$g$, as shown in FIG. 8, is a relatively large cutout section having a slant towards the center, and the slit 55$h$ is a triangular indented section at the corner.

On the other hand, a vertical oblong slit 54$f$ as a deformable section is formed in the near center of the inner portion of the peripheral wall 54$a$ at the vertical sides of the fixed frame 54.

Figure 9A:
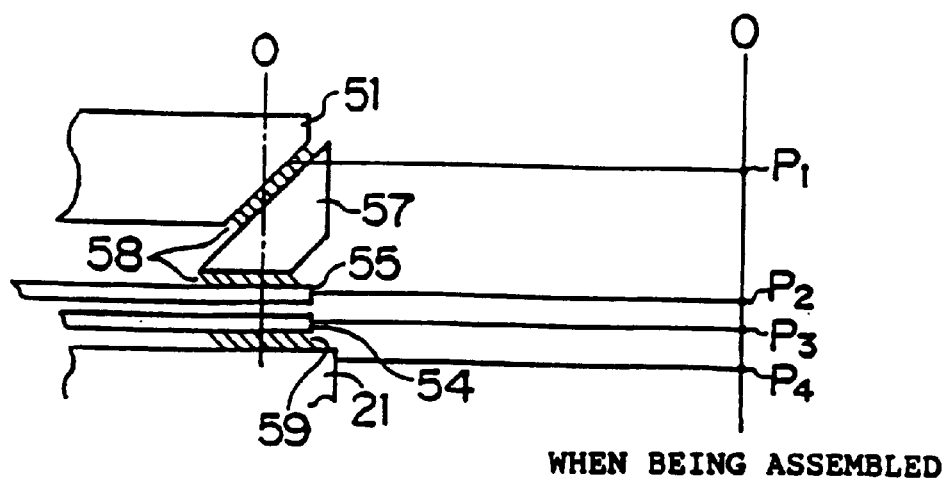
FIGS. 9(A)–(C) are drawings showing the positional relationship of the components of a liquid crystal panel unit in this embodiment at various temperatures.
Figure 9B:
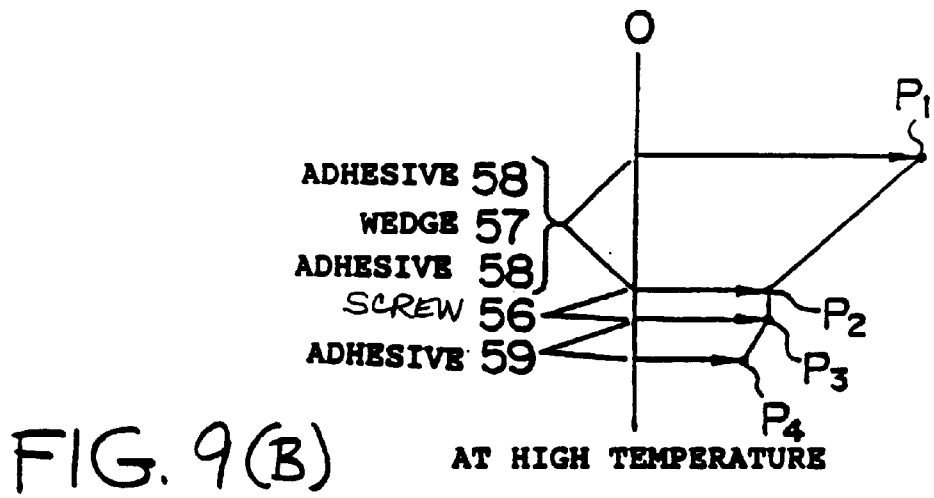
Figure 9C:
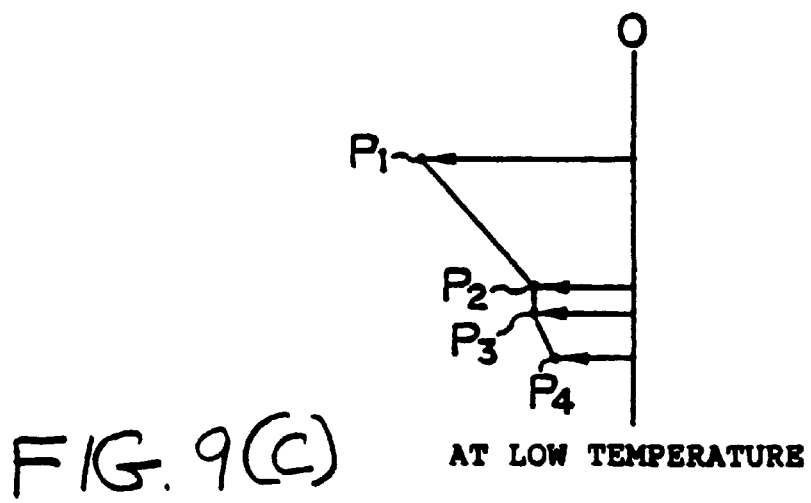

FIGS. 9(A)–(C) show positions of the components of each of the liquid crystal panel units 50R, 50G and 50B in this embodiment at various temperatures.

In FIGS. 9(A)–(C), symbols P1, P2, P3, and P4 represent positions of the panel frame 51, the intermediate frame 55, the fixed frame 54, and the prism 21 in the stacking direction. FIG. 9(A) shows a state when it is assembled (20° C.), FIG. 9(B) shows a sate when it remains at a high temperature (85° C.), and FIG. 9(C) shows a state when it remains at a low temperature (−25° C.).

The panel frame 51 and the wedge 57 are composed of synthetic resin and are integrated by an adhesive layer 58, and the moving point is represented by the point P1. The intermediate frame 55 and the fixed frame 54 are composed of the same metal and are integrally fixed to each other by a screw 56, and the moving point is represented by the point P2.

Observed shrunken or expanded lengths between the high temperature and the low temperature were, for example, −19 to +28 $\mu$m for P1, −9 to +13 $\mu$m for P2, −9 to +13 $\mu$m for P3, and −8 to +11 $\mu$m for P4. Thus, the difference of the shrunken or expanded lengths between the points P1 and P2 is approximately 10 to 15 $\mu$m.

In this embodiment, slits 55$g$ and 55$h$ are provided between the fixing section 55$f$ of the intermediate frame 55 for the wedge 57 and the screw hole 55$e$ for the screw 56 so that the member therebetween is readily subjected to elastic deformation.

On the other hand, since the fixed frame 54 has slits 54$f$ as shown in FIG. 7, the expansion between the points P3 and P4 is absorbed.

When the components of the liquid crystal panel units 50R, 50G and 50B are shrunken or expanded by the temperature difference, the movement of the panel frame 51 with respect to the prism 21 can be suppressed by voluntary deforming (concentrating the deformation) the sections of the slits 55$g$, 55$h$ and 54$f$. Thus, the pixel displacement between the respective liquid crystal panel units 50R, 50G, and 50B will barely occur. Since excess force is not applied to the adhesive layers 58 and 59, peeling will not occur.

It was found that the deformation of the panel frame 51 and the intermediate frame 55 having the above configurations preferably occurred within the following range.

The spring constant ratio of the spring constant of the panel frame 51 to the spring constant of the intermediate frame 55 lies in a range of 1 to less than 5, and more preferably 1 to less than 3. This range causes effective reduction of pixel displacement.

In such a spring constant ratio, elongation of the adhesive layer 58 for bonding the wedge 57 is preferably in a range of 75% to 125%.

In such a spring constant ratio, tensile strength of the adhesive layer 58 for bonding the wedge 57 is preferably in a range of 80 to 85 (kg/cm$^2$).

These ranges contribute to effective reduction of pixel displacement and prevention of peeling of the adhesive, resulting in improved reliability.

As shown in FIG. 8, the slits 54$f$ provided in the inner face of the fixed frame 54 and the slits 55$g$ and 55$h$ provided in the inner face of the intermediate frame 55 are arranged so as not to overlap in the thickness (stacking) direction. For example, the slit 54$f$ provided in the inner face of the fixed frame 54 is covered with the peripheral wall 55$b$ of the intermediate frame 55 to prevent a decrease in contrast due to mixing of unnecessary light with the light to be projected (optical leakage).

(Length and Contact Area of Wedge)

Next, the length of the wedge 57 will be described. As shown in FIG. 5, the length $L_s$ of the wedge 57 is ⅒ to ½ and more preferably ⅕ to ⅓ the length M of the portion for providing the wedge 57 of the panel frame 51. Such a range can effectively reduce displacement and can secure high reliability.

FIGS. 10(A)–(D) show the relationship between positions of the pane frame, the wedge, and the intermediate frame.

Figure 10A:
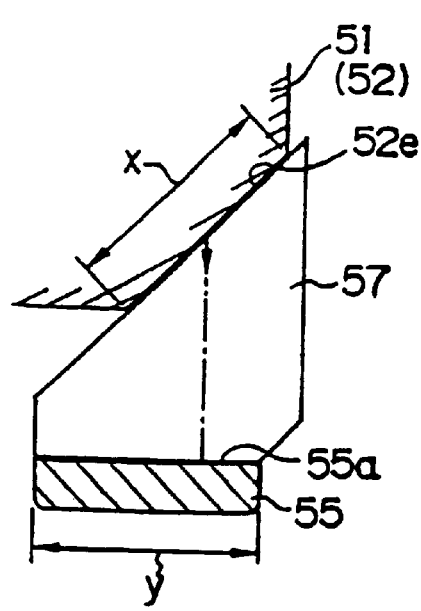
FIGS. 10(A)–(D) are drawings showing the positional relationship of a panel frame, a wedge, and an intermediate frame.

A guide face 52$e$ for guiding the wedge 57 is formed on the first frame 52 of the panel frame 51, and the wedge 57 is inserted between the guide face 52$e$ and the peripheral wall 55$b$ of the intermediate frame 55 in which an adhesive is applied to these faces. The length of the guide face 52$e$ is set in the x direction and the width of the peripheral wall 55$b$ is set in the y direction. FIG. 10(A) show a state before adjustment. When the panel frame 51 is outwardly moved in the direction of arrow z of FIG. 10(B), the wedge 57 is inwardly moved by the surface tension of the adhesive. The length x1 of the adhesive layer between the panel frame 51 and the wedge 57 is set to be larger than the length y1 of the adhesive layer between the wedge 57 and the intermediate frame 55. When the widths of the wedge 57 at the two contact faces are equal to each other, the relationship regarding the lengths of the adhesive layer corresponds to the relationship regarding the contact areas of the adhesive layer.

Figure 10B:
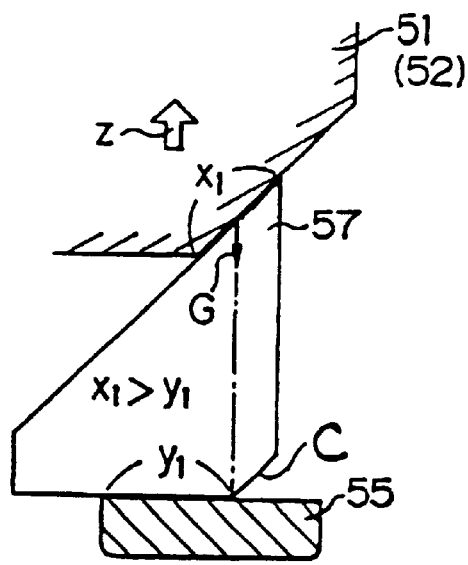

When the wedge 57 enters into the inner portion during positioning of the panel frame 51 compared with the state of FIG. 10(B), floating may occur due to the shift of the gravity point G to the plane C. Furthermore, the wedge 57 may detach. When the relationship x1>y1 is satisfied, the floating and detachment are prevented.

Figure 10C:
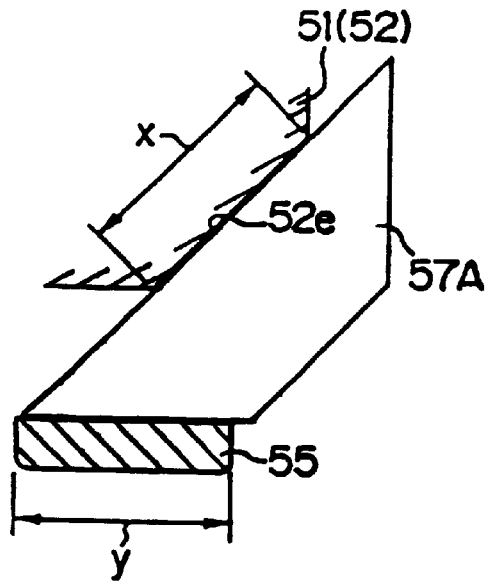
Figure 10D:
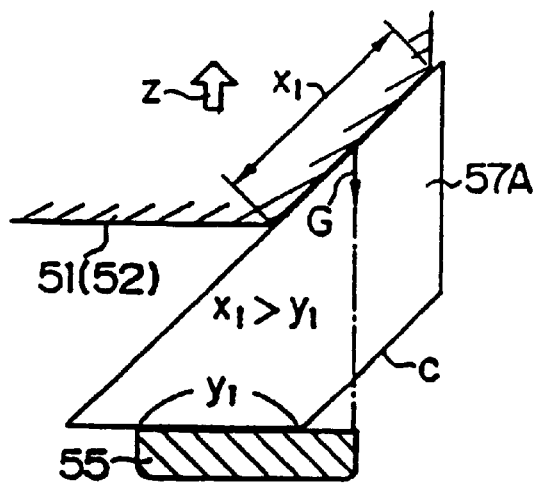

FIGS. 10(C) and 10(D) shows a wedge 57A having a different shape from that of the wedge 57 and used for a larger panel frame 51. As described above, the relationship x1>y1 also holds.

(Another Embodiment of Intermediate Frame)

Figure 11:
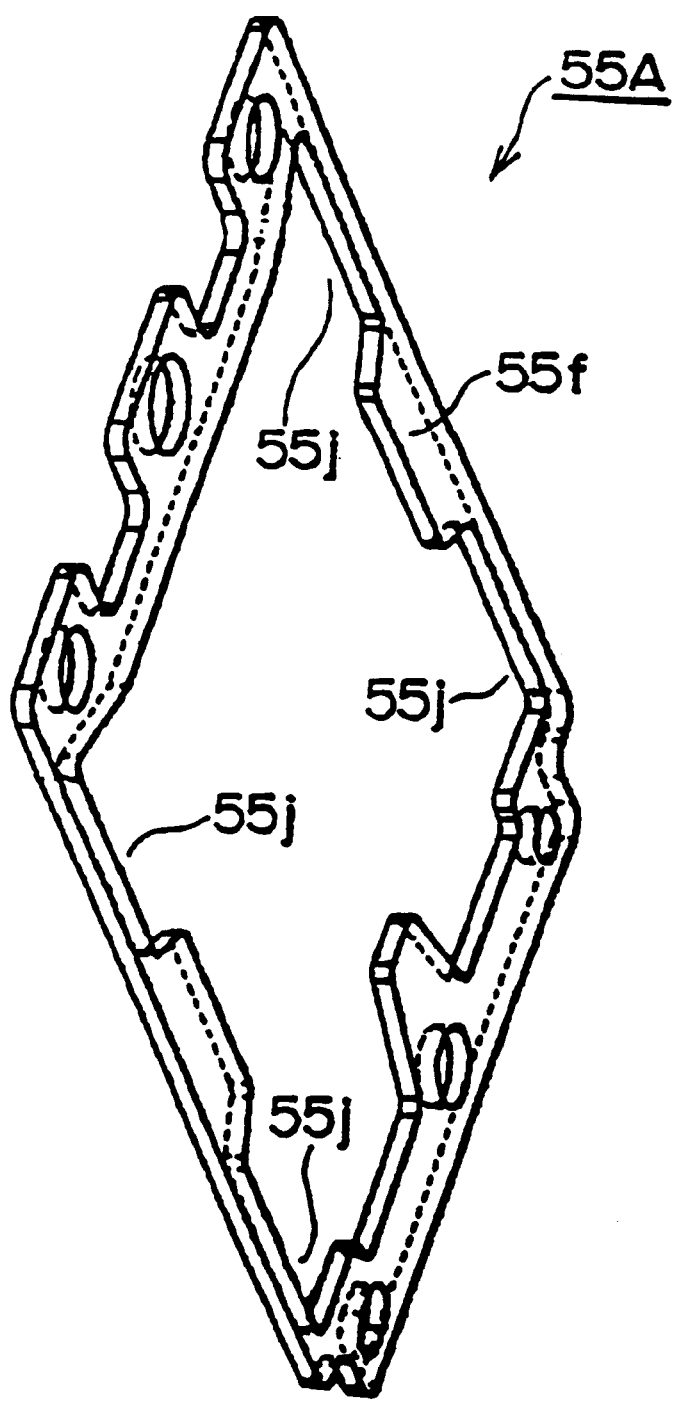
FIG. 11 is an isometric view of another embodiment of the intermediate frame.

FIG. 11 is an isometric view of another embodiment of the intermediate frame.

The intermediate frame 55A of this embodiment is a type not having an engaging projection 55*d* in the intermediate frame 55 shown in FIG. 6. In this case, each slit 55*j* has a shape which corresponds to a continuation of the slit 55*g* and the slit 55*h* of the intermediate frame 55. Since the slit 55*j* has a continuous shape, the deformation can be more readily controlled.

(Another Embodiment of Fixed Frame)

Figure 12:
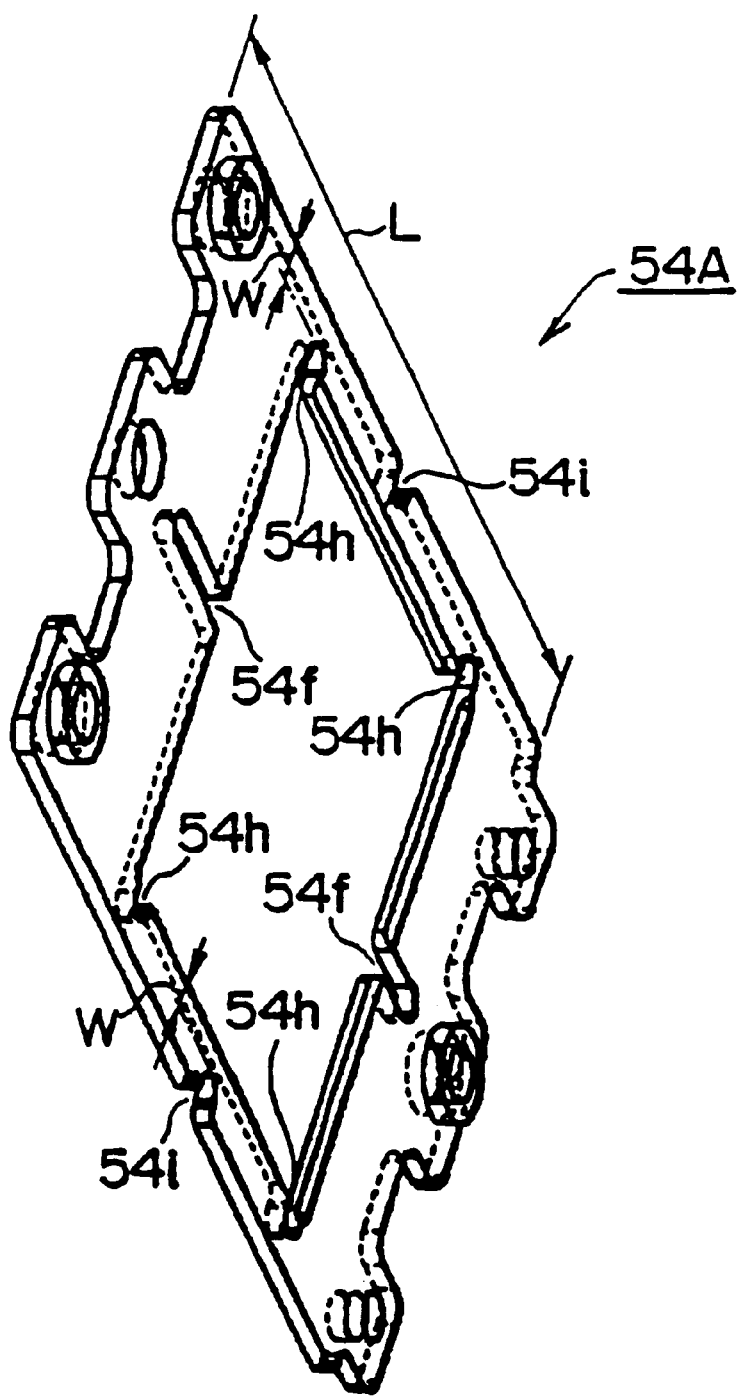
FIG. 12 is an isometric view of another embodiment of the fixed frame.

FIG. 12 is an isometric view of another embodiment of the fixed frame.

The fixed frame 54A of this embodiment has slits 54*h* formed at the left and right corners and slits 54*i* formed in the centers on the left and right sides, in addition to the slits 54*f* at the inner upper and lower sides. The provided slits 54*h* and 54*i* facilitate the outward deformation at the positions corresponding to the wedges 57.

The width of the peripheral wall provided with the slits will now be described in further detail.

As shown in FIG. 12, the peripheral wall 54*b* is reduced in thickness, for example, corresponding to the provided slits 54*h* and 54*i*, and the width W of the thin peripheral wall is set as follows.

$$W<=(a_0/a_1) \times L$$

Wherein $a_0$ is the linear expansion coefficient of the prism 21, $a_1$ is the linear expansion coefficient of the intermediate frame 55, and L is the length of the section of one side having the slit among the four sides of the fixed frame 54. Such setting can effectively reduce displacement.

More particularly, the width W is in a range of 0.1 mm to 5 mm and more preferably 1 mm to 3 mm for an outer size of 24×31 mm of the fixed frame 54, because such a range can effectively reduce displacement.

(Modified Embodiments)

Various modifications and changes can be employed as a scope of equivalents of the present invention, in addition to the above-described embodiments.

(1) The deformable section is not limited to the slit, but may have a reduced thickness or may be a through hole as long as the section can facilitate elastic deformation.

(2) The shape and number of the slits is not limited to the above description, as long as displacement is effectively reduced.

(3) Although the fixed frame and the intermediate frame are separately provided in the above embodiments, the fixed frame may be directly attached to the panel frame with wedges provided therebetween without using the intermediate frame. In this case, the fixed frame may have similar slits.

(4) There are two types of projection display devices, that is, a front projection display device performing projection from the side observing the projected screen and a rear projection display device performing projection in the direction away from the side observing the projected screen. The present invention is applicable to the both types. When a dichroic prism is used as the light synthesizing element, a modulation element is positioned and fixed to the face of the dichroic prism using a fixed frame, a modulation element frame, a fixing member, and a positioning member. This fixing configuration is also applicable to a configuration for positioning and fixing a solid state imaging element, such as a charge coupled device (CCD), to a color decomposing prism.

(5) Although an adhesive is used to temporarily tack the panel frame 51 to the intermediate frame 55 in this embodiment, soldering or the like may be alternatively employed. When the first frame 52 and the like are composed of resin, a metallic member bonded to the fixing section or a metallized layer formed at the fixing section may be used

[Advantages]

In accordance with the present invention as described above, a deformable section is provided to the fixed frame; hence, the deformable section can absorb deformation of a modulation element frame due to a change in temperature and thus pixel displacement of colors does not occur.

What is claimed is:

1. A projection display device that modulates a plurality of color light beams through a plurality of modulation elements in response to image information, synthesizes the modulated color light beams by a light synthesizing element, and enlarges and projects the synthesized color light beams by a projection system, the projection display device comprising:

a frame system fixed to a light incident face of the light synthesizing element;

a modulation element frame detachably mounted to the fixed frame system that holds the modulation elements;

a position adjusting member that positions the modulation element frame and the fixed frame system; and a fixing member that fixes the modulation element frame to the fixed frame system with the position adjusting member therebetween, the fixed frame system having a fixing section that fixes the position adjusting member, and having a deformable section in a portion other than the fixing section, that elastically deforms compared to the fixing section.

2. The projection display device according to claim 1, the fixed frame system including:

a first frame fixed to the light incident face of the light synthesizing element; and a second frame detachably mounted to the first fixed frame and fixed to the modulation element frame, the second fixed frame being fixed to the first fixed frame by a second fixing member;

the second fixed frame having a fixing section that fixes the position adjusting member, and at least one of the first fixed frame and the second fixed frame having a deformable section in one of a portion which does not overlap the fixing section or a portion other than the fixing section, the deformable section being elastically deformable compared to the fixing section.

3. The projection display device according to claim 2, the deformable section being provided between the fixing section and the second fixing member.

4. The projection display device according to claim 1, the position adjusting member being provided near a center between two opposing sides of the modulation element frame.

5. The projection display device according to claim 1, a spring constant ratio of the deformable section to the modulation element frame being in a range of 1 to less than 5.

6. The projection display device according to claim 5, the fixing member comprising an adhesive; and an elongation of the adhesive being in a range of 50% to 125%.

7. The projection display device according to claim 5, the fixing member comprising an adhesive; and
a tensile strength of the adhesive being in a range of 40 to 100 (kg/cm$^2$).

8. The projection display device according to claim 1, the deformable section comprising at least one slit.

9. The projection display device according to claim 8, the light synthesizing element comprising a prism;
one of the fixed frame system and the first fixed frame being provided with a section having a slit as the deformable section, and
a frame width W at the section provided with the slit satisfying a relationship:

$$W <= (a_0/a_1) \times L$$

$a_0$ being a linear expansion coefficient of the prism, $a_1$ being a linear expansion coefficient of the fixed frame system or the first fixed frame, and L being a length of a bonded section of one side provided with the slit of one of the fixed frame system and the first fixed frame.

10. The projection display device according to claim 9, in one of the fixed frame system and the first fixed frame, a width of a non-slit section among a frame width at the section provided with the slit being in a range of 0.1 mm to 5 mm.

11. The projection display device according to claim 8, in the first fixed frame or the second fixed frame, positions for providing the slit not overlapping with each other.

12. The projection display device according to claim 1, a length of the position adjusting member being $\frac{1}{10}$ to $\frac{1}{2}$ a length of a side of the modulation element frame that fixes the position adjusting member.

13. The projection display device according to claim 1, a bonding area between the position adjusting member and the modulation element frame being larger than a bonding area between the position adjusting member and one of the fixed frame system and the first fixed frame.

14. The projection display device according to claim 1, at least one of the modulation element frame and the position adjusting member including a synthetic resin and being annealed prior to assembling.

* * * * *